United States Patent [19]
Krebs

[11] Patent Number: 5,850,611
[45] Date of Patent: Dec. 15, 1998

[54] METHOD AND APPARATUS FOR COMMUNICATING IN A DISPATCH COMMUNICATION SYSTEM

[75] Inventor: Jay R. Krebs, Crystal Lake, Ill.

[73] Assignee: Motorola, Inc., Schaumburg, Ill.

[21] Appl. No.: 965,691

[22] Filed: Nov. 7, 1997

[51] Int. Cl.$^6$ ................................................ H04B 1/00
[52] U.S. Cl. .......................................... 455/518; 455/527
[58] Field of Search ............................... 455/426, 518, 455/517, 520, 524, 507, 560, 527, 508, 512, 519

[56] References Cited

U.S. PATENT DOCUMENTS

| | | | |
|---|---|---|---|
| 4,646,345 | 2/1987 | Zdunek et al. | 455/508 |
| 5,159,702 | 10/1992 | Aratake | 455/464 |
| 5,491,835 | 2/1996 | Sasuta et al. | 455/518 |
| 5,530,914 | 6/1996 | McPheters | 455/518 |
| 5,745,853 | 4/1998 | Hippelainen | 455/517 |

*Primary Examiner*—Reinhard J. Eisenzopf
*Assistant Examiner*—Marsha D. Banks-Harold

[57] ABSTRACT

A dispatch communication system (100) that includes a system controller (101), multiple base sites (103–105), and a group of communication units (107–111) employs a method and apparatus for communicating therein. A system device (either the system controller or a communication unit) establishes a dispatch communication between the group of communication units. Once the communication is established, the system device starts a timer and continuously determines a first length of time (call time) since establishment of the communication. The system device also determines whether an event indicative of call reassignment has occurred during the communication. When such an event has occurred, the system device determines a second length of time (hang time) based on the call time, wherein the hang time commences upon the occurrence of the event. Upon determining the hang time, the system device further determines whether call reassignment has occurred within the hang time. When call reassignment has not occurred within the hang time, the system device terminates the call.

10 Claims, 3 Drawing Sheets

METHOD AND APPARATUS FOR COMMUNICATING IN A DISPATCH COMMUNICATION SYSTEM

FIELD OF THE INVENTION

The present invention relates generally to communication systems and, in particular, to reducing the probability of call dragging during a dispatch communication in a multiple site radio communication system.

BACKGROUND OF THE INVENTION

Dispatch communication systems are known. Such systems facilitate communications between groups of radio communication units, such as two-way radios or radiotelephones. Dispatch communication systems are arranged in various configurations, including single site and multiple site configurations. In a typical multiple site configuration, the dispatch system includes a system controller and a plurality of base sites, wherein each base site provides communication service to a respective service coverage area under the control of the system controller.

When a communication unit of a group desires to initiate a group call, the unit transmits a group (or dispatch) call request to the system controller via the unit's serving base site. Upon receiving the request, the system controller queries a database to determine which base sites will be required to provide one or more communication resources (traffic channels) in support of the requested communication. The database typically includes a mapping of communication units to base sites. As is known, a key principle in providing reliable communications in multiple site communication systems is mobility management. Thus, communication units typically register with the system controller as they travel throughout the system upon entering a new service coverage area. To register, the communication unit transmits a registration message via a control channel in accordance with known techniques. Once the system controller receives such a registration message, it updates the communication unit-to-base site mapping in the database.

Upon determining which base sites are affected by the group call request, the system controller—which is responsible for allocating channels to support requested communications—determines whether the identified base sites have available resources to support the requested group call. When such resources are available, the system controller grants the request and allocates (by instruction to the respective base sites) the communication resources necessary to support the call.

Once the group call is established, a problem arises in a multiple site system configuration. The problem is that the communication units involved in the call can no longer access a system control channel. Access to the control channel is prohibited during a group call either due to the high probability of message collisions when multiple communication units are attempting to access the same control channel at about the same time or because the units participating in the group call are transmitting or receiving on the traffic channels that have been allocated to the call. Thus, communication units cannot update their registrations during the group call and, more importantly, the system controller cannot update so-called neighbor site lists of the communication units during the group call.

Prior to the group call (e.g., in response to a registration), each communication unit of the group receives a list of base site control channel identifications from the system controller. The listed control channels typically comprise control channels of base sites adjacent to (or neighboring—thus, the reference "neighbor site list") the base site with which the communication unit most recently registered. The communication unit uses the neighbor site list to identify sites with which to reconnect into the group call in the event that the signal quality of the call on the current traffic channel degrades below a desired quality level. Signal quality degradation is typically the result of movement of the communication unit out of the service coverage area of the currently serving base site.

When a communication unit detects poor signal quality, it selects a neighboring site control channel from the neighbor site list and, if it has not already done so as part of a neighbor site scan process, measures the signal quality of the selected control channel. If the signal quality of the neighboring site's control channel is acceptable, the communication unit requests reconnection into the group call (i.e., either allocation of a channel or identification of an allocated channel if a channel has already been allocated for the group call at the neighboring base site). Upon reconnection, the communication unit continues participation in the group call.

During lengthy group calls (e.g., calls lasting several minutes in duration), mobile communication units may travel through multiple service coverage areas depending upon the service coverage area layout of the system and the speed of the communication unit. However, since the system controller cannot update the neighbor site lists of the communication units during the call, a communication unit may not be able to locate a base site providing a control channel with acceptable signal quality when a reconnect is desired. Thus, the signal quality of the group call received by the communication unit remains poor because an alternative base site with acceptable signal quality cannot be identified by the communication unit. The condition in which a communication unit in a dispatch call cannot locate a reconnect site with satisfactory signal quality is known as call dragging.

One source of delay that adds to the length of a dispatch communication is the so-called hang time. The hang time is the time a traffic channel or channels remain allocated to the group call after one group member finishes communicating in anticipation of a response from another group member. In typical dispatch systems, the hang time is of a fixed duration (e.g., five seconds). Thus, each time one group member finishes communicating and releases the push-to-talk (PTT) button of the member's communication unit, each member of the group has an equal opportunity to acquire an allocated traffic channel and continue the call for the duration of hang time. For group calls among many members, repeated continuations of the call can result in rather lengthy group calls, thereby increasing the probability of call dragging. For example, in a group call between ten group members, if each group member continues the call just prior to expiration of the hang time and talks for 30 seconds, the group call would be approximately 345 seconds (just under 6 minutes), which may be sufficient time for a group member to travel through one or more base site service coverage areas when the group member is traveling on an expressway at 65 miles per hour in an urban area. Without being able to receive an update to its neighbor site list, the rapidly moving group member is likely to incur poor signal quality due to dragging of the group call.

Therefore, a need exists for a method and apparatus of communicating in a dispatch communication system that reduces the probability of call dragging, thereby improving the signal quality of dispatch communications.

DESCRIPTION OF A PREFERRED EMBODIMENT

Generally, the present invention encompasses a method and apparatus for communicating in a dispatch communication system. The dispatch communication system includes a plurality of base sites, at least one group of communication units, and a system controller. A system device (either the system controller or a communication unit) establishes a dispatch communication between a first group of communication units. Once the communication is established, the system device starts a timer and continuously determines a first length of time (call time) since establishment of the communication. The system device also determines whether an event (e.g., release of a communication unit's push-to-talk (PTT) button) indicative of call reassignment has occurred during the communication. When such an event has occurred, the system device determines a second length of time (hang time) based on the call time, wherein the hang time commences upon the occurrence of the event. Upon commencement of the hang time timer, the system device determines whether call reassignment has occurred within the hang time. When call reassignment has not occurred within the hang time, the system device terminates the call. By providing dispatch communications in this manner, the present invention reduces the probability of call dragging during dispatch calls in multiple site communication systems by setting the hang time as a function of the call duration. Since the likelihood of call dragging increases as the duration of the call increases, variably setting the hang time to decrease as the call duration increases permits a temporary call termination and, if necessary, reloading of neighbor site lists to occur prior to call dragging to insure satisfactory signal quality of the original and continued calls.

Figure 1:
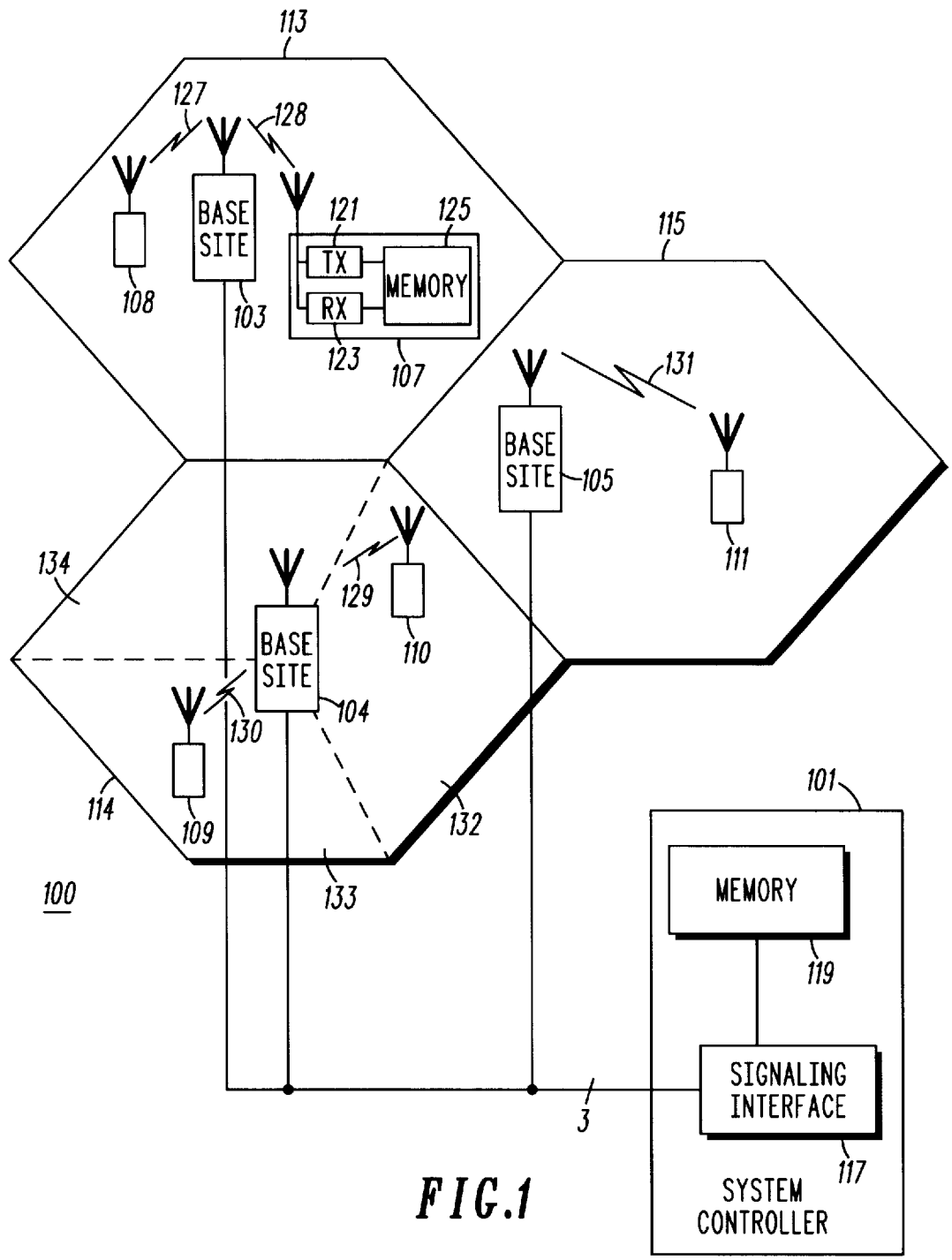
FIG. 1 illustrates a block diagram depiction of a dispatch communication system in accordance with the present invention.
Figure 2:
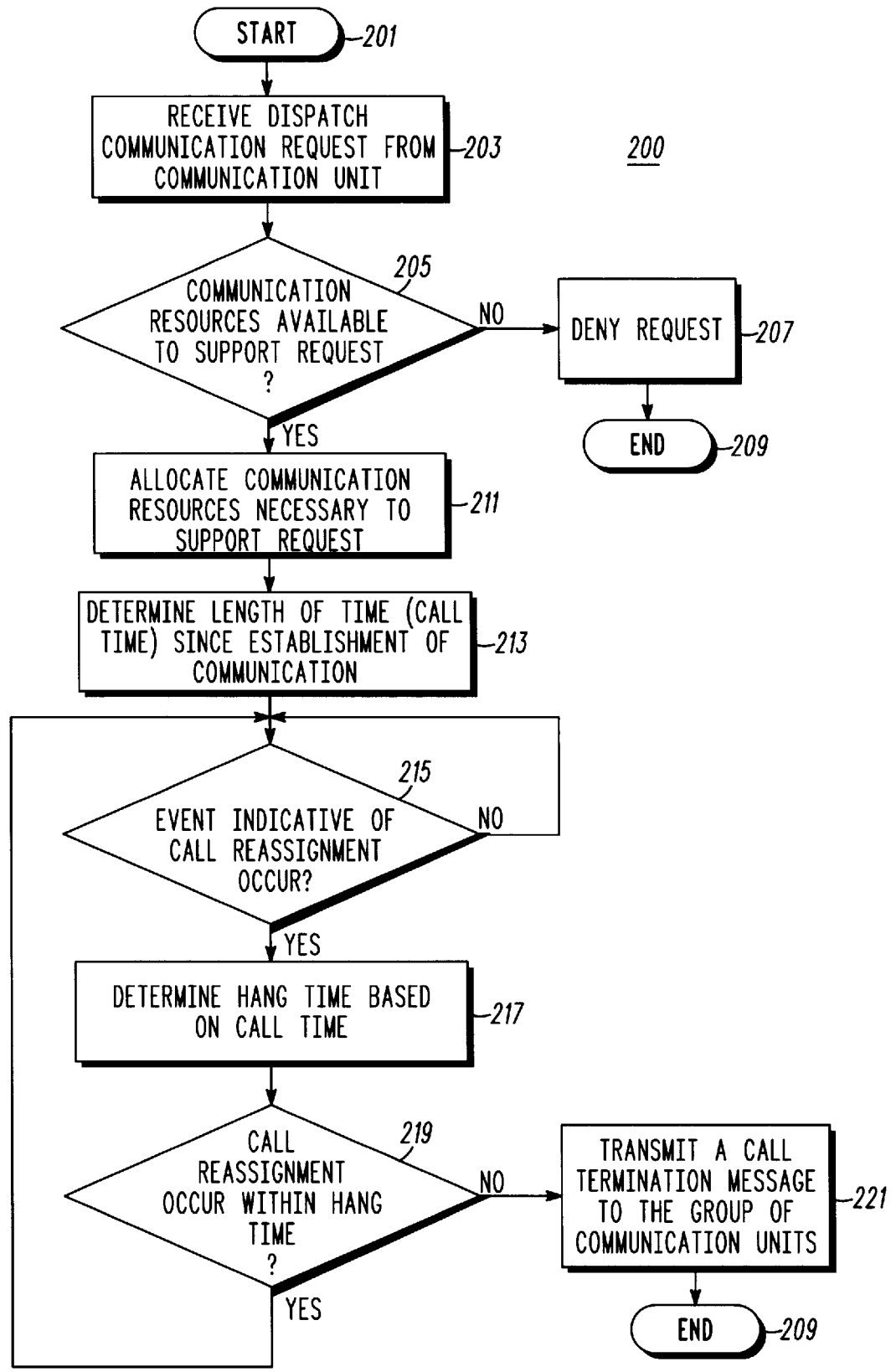
FIG. 2 illustrates a logic flow diagram of steps executed by a system controller to facilitate communication between a group of communication units in accordance with the present invention.
Figure 3:
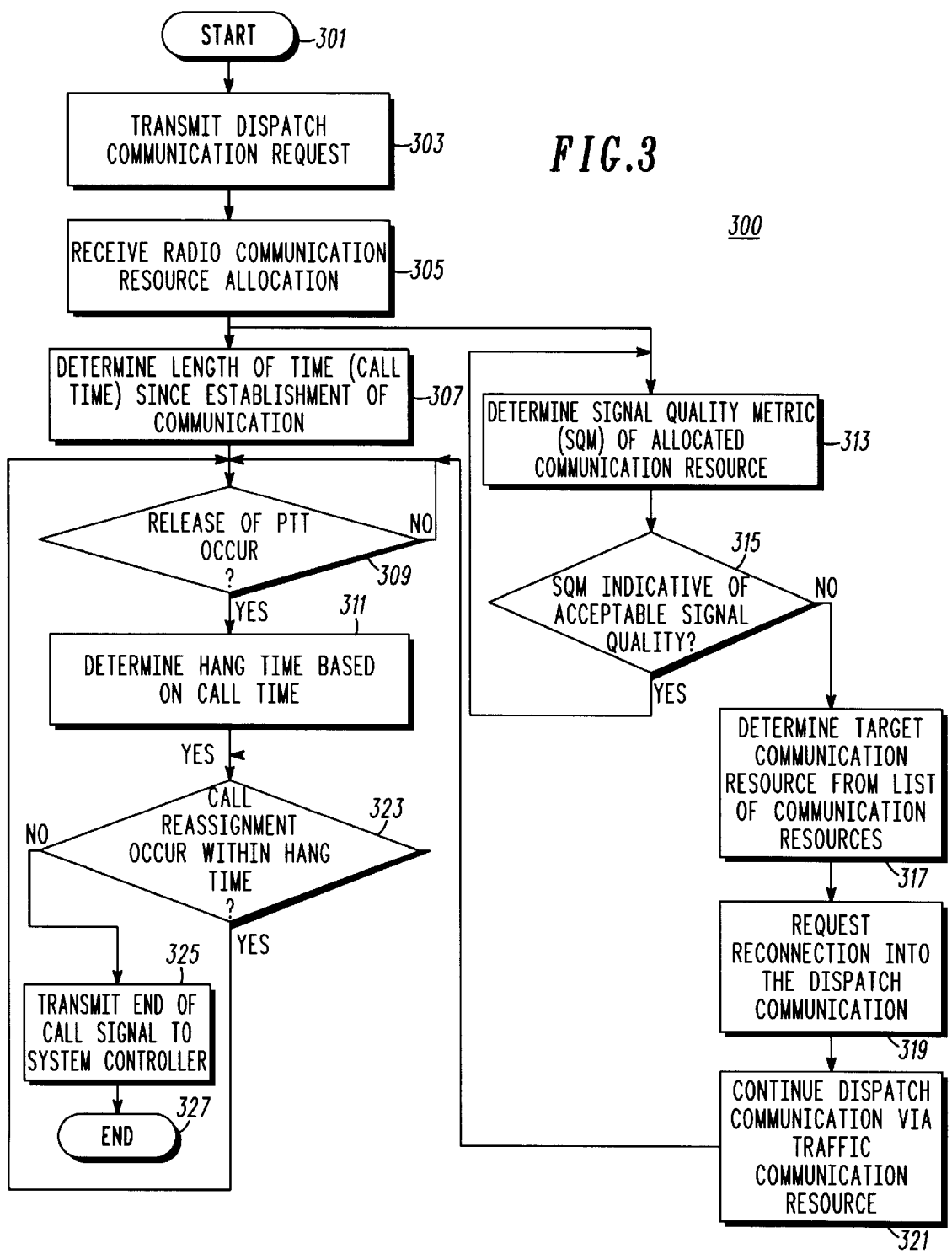
FIG. 3 illustrates a logic flow diagram of steps executed by a communication unit to communicate with a group of communication units in accordance with the present invention.

The present invention can be more fully understood with reference to FIGS. 1–3. FIG. 1 illustrates a block diagram depiction of a dispatch communication system 100 in accordance with the present invention. The communication system 100 includes a system controller 101, a plurality of base sites 103–105, and a plurality of communication units 107–111. The system controller 101 preferably comprises a dispatch application processor (DAP), such as the "iDEN" DAP that is commercially available from Motorola, Inc., and includes a signaling interface 117 and a memory device 119. The signaling interface 117 preferably comprises a T1 interface; however, other interfaces, such as an analog modem or a tone signaling interface, might be alternatively used. The memory device 119 preferably comprises random access memory (RAM) for storing a computer program and a microprocessor to execute the stored computer program. However, in an alternative embodiment, the memory device 119 might comprise another computer-readable storage medium, such as a read only memory (ROM), a programmable read only memory (PROM), a diskette, a hard disk, a PCMCIA memory card, a logic circuit, a mass storage medium, an optical disk, a CD-ROM, a magnetic disk, or a digital versatile disk (DVD). As described below, the computer program stored in and executed by the memory device 119 performs most of the steps executed by the system controller 101 in accordance with the present invention.

The base sites 103–105 preferably comprise "iDEN" Enhanced Base Transceiver Sites (EBTSs), which are commercially available from Motorola, Inc., and provide at least dispatch communication services to a respective plurality of service coverage areas 113–115. In the preferred embodiment, the communication system 100 also provides communication services other than dispatch (e.g., short message service and telephone interconnect); accordingly, the base sites 103–105 preferably support such other services.

The communication units 107–111 preferably comprise two-way radio or radiotelephone devices, such as Motorola "iDEN" mobile or portable radios, and are arranged into one or more talk groups. In the depicted communication system 100, the communication units 107–111 are all members of a single talk group. Each communication unit 107–111 preferably comprises a transmitter 121 ("TX" in FIG. 1), a receiver 123 ("RX" in FIG. 1), and a memory device 125. The transmitter 121 transmits voice and control information to the system infrastructure (base site 103–105 or base site 103–105 and system controller 101) in response to actions of the communication unit's user. The receiver 123 receives voice and control information from the system infrastructure in response to actions by other communication units or the system controller 101. The functions of the communication unit's transmitter 121 and receiver 123 with respect to the present invention will be described in more detail below.

The memory device 125 preferably comprises read only memory (ROM) for storing a computer program and a microprocessor to execute the stored computer program. However, in an alternative embodiment, the memory device 119 might comprise a random access memory (RAM), a programmable read only memory (PROM), a diskette, a hard disk, a PCMCIA memory card, a logic circuit, a mass storage medium, an optical disk, a CD-ROM, a magnetic disk, or a digital versatile disk (DVD). As described below, the computer program stored in and executed by the memory device 125 performs most of the steps executed by a communication unit 107–111 in accordance with the present invention.

Operation of the communication system 100 occurs substantially as follows in accordance with a preferred embodiment of the present invention. When a communication unit (e.g., 107) desires to initiate a dispatch communication with a group of communication units 107–111, the communication unit 107 uses its transmitter 121 to transmit a dispatch communication request via a control communication resource (e.g., 128) to the base site 103 serving the coverage area 113 containing the communication unit 107. Upon receiving the request, the base site 103 forwards the request to the system controller 101. The system controller 101, via its signaling interface 117, receives the request, which includes a talk group identification for the requesting communication unit 107, and employs its memory device 119 to consult a database (not shown) containing the registration information (e.g., registration status and serving base site) of the other communication units 108–111 in the requesting communication unit's talk group.

As is known in multi-site communication systems, the communication units 107–111 register with the system controller 101 upon entering the system 100 (e.g., powering up). The system controller 101 then stores the registration information for each communication unit 107–111 in a database (e.g., a home location register). As the communication units 107–111 travel throughout the system 100, they update their registrations (retransmit registration messages) upon entering service coverage areas or location areas (groupings of service coverage areas). However, registration updates can only occur when the communication units 107–111 have access to a control communication resource and, thus, do not normally occur during dispatch communications as described above.

Upon registering with the system controller 101, each communication unit 107–111 receives from the system controller 101 a respective list of neighboring site control channels (sometimes referred to as a "neighbor cell or site list"). As described above, the neighbor site list identifies control channels of base sites adjacent to the base site with which the respective communication unit most recently registered. As the communication units 107–111 update their registrations, the system controller 101 updates the communication units' neighbor site list. However, as with registration updates, neighbor site list updates can only occur when the communication units 107–111 have access to a control communication resource and, thus, do not normally occur during dispatch communications.

Upon determining the registration information of the communication units 107–111 in the group, the system controller 101 determines whether a sufficient number of communication resources 127–131 are available at the base sites 103–105 serving the communication units 107–111 to support the requested group communication. When a sufficient number of communication resources 127–131 are available at the base sites 103–105, the system controller 101 allocates the appropriate number of resources at each base site 103–105 to support the communication. For example, in service coverage areas 113, 115 with omni-directional coverage, the system controller 101 preferably allocates one communication resource (e.g., 127) to be shared by all the communication units (e.g., 107, 108) of the group that are located in the particular service coverage area (e.g., 103). On the other hand, in service coverage areas (e.g., 114) that are divided into multiple sectors 132–134, the system controller 101 preferably allocates one communication resource 129, 130 in each sector 132, 133 containing a communication unit. Depending on the multiple access technique employed by the communication system 100, the communication resources 127–131 may comprise pairs (one for transmit and one for receive) of frequency carriers in a frequency division multiple access (FDMA) system, pairs of time slots in a time division multiple access (TDMA) system, or pairs of orthogonal codes (whether implemented through direct sequences or frequency hopping) in a code division multiple access (CDMA) system.

To implement the resource allocation, the system controller 101 conveys, via its signaling interface 117, resource allocation commands to the appropriate base sites 103–105. The base sites 103–105 then transmit the resource allocations to their respective communication units 107–111 via control resources, such as control resource 128. It should be noted that in a TDMA system, one frequency may be used to support both the control resource (i.e., control time slot) and the resource allocated to support the dispatch communication (i.e., traffic time slot). In this case, communication resources 127 and 128 may be conveyed over a single frequency.

Once the resource allocations are made, the system controller 101 initiates a subroutine stored in its memory device 119 to maintain the time since commencement of the communication. This time (hereinafter referred to as "call time") will be used below to determine a variable hang time for maintaining the resource allocations, even though the resources are not being used.

Upon receiving their allocations, the communication units 107–111 begin participating in the group communication. For example, the user of communication unit 107 depresses the unit's push-to-talk (PTT) button (not shown) and begins talking. The communication unit's transmitter 121 then transmits the voice communication to the serving base site 103, which in turn provides the voice communication to the other base sites 104, 105 in accordance with known techniques (e.g., via a switch and one or more packet duplicators (not shown) operating under the control of the system controller 101). Once the user has finished talking, the user releases the PTT button and the communication unit 107 transmits an end of transmission (EOT) message to the system controller 101 and the other communication units 108–111 via the base sites 103–105.

Upon receipt of the EOT message, the system controller 101 initiates another subroutine in the computer program stored in its memory device 119 to determine a hang time based on the call time. The hang time is the time period during which the allocated communication resources 127–131 remain allocated, even though no voice transmissions are presently occurring, in anticipation of a voice transmission from one of the communication units 107–111 in the group. In a preferred embodiment, the hang time is gradually reduced once a predetermined call time is reached. For example, the hang time may remain constant until a first predetermined call time is reached (e.g., six seconds) and then decrease linearly, reaching zero at a second predetermined call time (e.g., ten seconds). In an alternative embodiment, the hang time may remain constant (e.g., at six seconds) until the call time is greater than or equal to a predetermined call time (e.g., two minutes), and then abruptly decrease to zero indicating temporary call termination upon release of the PTT by the currently transmitting communication unit. One of ordinary skill will recognize that many other possibilities exist for varying the hang time as a function of call time and such other embodiments are within the spirit and scope of the present invention.

Once the hang time is determined, the system controller 101, via the computer program running in the controller's memory device 119, determines whether a call reassignment (e.g., depression of the PTT button of one of the communication units 107–111) has occurred within the hang time. When a call reassignment has not occurred within the hang time, the system controller 101, via the computer program and the signaling interface 117, sends a call termination message to the base sites 103–105 for subsequent transmission over the allocated communication resources 127–131 to the communication units 107–111. When a call reassignment has occurred within the hang time, the system controller 101 awaits another event indicative of call reassignment (e.g., release of the PTT button) and then recalculates the new hang time based on the present call time.

During the communication, each communication unit 107–111 preferably monitors the signal qualities of its allocated communication resource and the control communication resources identified in the communication unit's neighbor site list using any one of several known signal quality metrics, such as received signal strength, bit error rate, or carrier-to-interference plus noise ratio (C/(I+N)). When the measured signal quality metric of the allocated communication resource becomes indicative of an unacceptable signal quality (e.g., degrades below a desired threshold, such as 19 decibels (dB) for a C/(I+N) metric), the communication unit 107 consults the neighbor site list to determine which base sites 104–105 in the system 100 might have a communication resource of acceptable signal quality. As discussed above, the neighbor site list is provided to the communication unit 107 at some time prior to establishment of the communication (typically in response to the communication unit's registration). The communication unit 107 then selects a base site (e.g., base site 105) providing a control communication resource of acceptable signal quality as a target base site for reconnection in accordance with known techniques.

Upon identifying the target base site 105, the communication unit 107 transmits a request to the system controller 101, via the control communication resource of the target base site 105, to reconnect into the communication. Upon receipt of the request to reconnect and provided that the communication has not been terminated, the system controller 101 allocates a communication resource at the target base site 105 in support of the communication and the communication unit 107 continues the communication via the newly allocated communication resource at the target base site 105.

As described above, the present invention provides for use of a variable hang time that is dependent upon the length of time since establishment of a dispatch call. The present invention provides a particular advantage to multiple site dispatch communication systems because a call time-dependent hang time reduces the likelihood of call dragging as communication units travel throughout coverage areas of the communication system. As discussed above, communication units in multiple site dispatch systems rely on neighbor site lists received prior to commencement of a communication to enable the communication units to reconnect into the communication as the communication units travel throughout the service coverage areas of the system. When a call is lengthy and the hang time is constant, the neighbor site list does not serve its purpose of providing a list of base sites that are most likely to have communication resources of acceptable signal quality because, when a communication unit reconnects at a new base site, the old neighbor site list does not list all the control channels of the base sites that are immediate neighbors of the new base site. In addition, as is well-known in the art, communication units do not have access to a control channel during a dispatch call to receive new neighbor site lists. Thus, use of a constant hang time as in existing dispatch communication systems can result in poor quality communications during lengthy calls due to the communication units' inability to obtain new neighbor site lists as they travel throughout the communication system.

By contrast, the present invention solves the poor quality problem by varying the hang time based on the call time and thereby temporarily terminating the call more quickly as the call time increases. By timing the temporary call termination to the time the system typically takes to reassign a new traffic channel to the call, the communication unit can return to the control channel, acquire a new neighbor site list from the current serving site, and reinitiate the dispatch call by depressing the PTT without perceiving any substantial interruption in the call. The temporary call termination and reinitiation processes may be repeated any number of times during a dispatch call, thereby resulting in higher quality dispatch communications by allowing neighbor site lists to be updated during long dispatch calls.

FIG. 2 illustrates a logic flow diagram 200 of steps executed by a system controller to facilitate communication between a group of communication units in accordance with the present invention. The logic flow begins (201) when the system controller receives (203) a dispatch communication request from a communication unit via a base site serving the service coverage area containing the communication unit. The request includes the identification of the requesting communication unit and an identification of the talk group that includes the requesting communication unit. The system controller then determines (205) whether radio communication resources are available at the base sites to support the requested communication. This determination preferably involves querying a database within the system controller that contains the status of the communication resources at each base site providing communication service to at least one communication unit in the requesting communication unit's talk group.

When a sufficient number of communication resources are not available at the base sites to support the communication, the system controller denies (207) the request and the logic flow ends (209). However, when a sufficient number of communication resources are available at the base sites to support the requested dispatch communication, the system controller allocates (211) the communication resources at the appropriate base sites (i.e., those base sites that are providing communication services to communication units in the talk group of the requesting communication unit) in support of the requested communication.

Once the communication resources have been allocated and the communication has thereby been established, the system controller preferably starts a call timer to determine (213) a length of time (call time) since establishment of the communication. As the communication progresses, the system controller determines (215) whether an event indicative of call reassignment (e.g., receipt of an EOT message subsequent to a communication unit user's release of the unit's PTT button or termination of a communication unit's transmission due to the communication unit's moving out of the system's coverage area or running out of battery power) has occurred. When such an event has not occurred, the communication continues and the system controller continues (215) monitoring for such an event. However, when an event indicative of call reassignment has occurred, the system controller determines (217) a hang time commencing at the time of the event based on the call time. Thus, in contrast to existing dispatch systems that use a fixed hang time, the present invention determines a hang time that is dependent upon the present length of time since establishment of the communication.

Upon determining the hang time, the system controller determines (219) whether a call reassignment has occurred within the hang time. In a preferred embodiment, this determination consists of monitoring received messages for an indication that a communication unit in the talk group (including the unit that may have just released its PTT button and transmitted an EOT message) has depressed its PTT button and desires to communicate via the allocated communication resources. When a call reassignment has occurred within the hang time, the system controller continues the logic flow at decision block 215. However, when a call reassignment has not occurred within the hang time, the system controller transmits (221) a call termination message to the group of communication units via the allocated communication resources and the logic flow (as well as the communication) ends (209).

In a preferred embodiment, steps 201–219 and part of step 221 (e.g., generation of the call termination message) of the above logic flow diagram 200 are performed by a computer program that is stored in a computer-readable memory device of the system controller.

FIG. 3 illustrates a logic flow diagram 300 of steps executed by a communication unit to communicate with a group of communication units in accordance with the present invention. The logic flow begins (301) when the communication unit transmits (303) a dispatch communication request to a system controller and receives (305), responsive to the request, a radio communication resource channel allocation, thereby establishing a dispatch communication. Once the communication is established, the communication unit determines (307) a length of time (call time) since establishment of the communication and determines (309) whether the PTT button of a presently transmitting communication unit (including itself) has been released. The communication unit preferably determines whether the PTT button of another communication unit has been released by monitoring the allocated radio communication resource for an EOT message from the transmitting communication unit. Needless to say, when the present transmitting unit is the communication unit itself, the communication unit need only detect the release of its own PTT button and need not monitor for an EOT message.

Once a PTT button release has been detected, the communication unit determines (311) a hang time based on the call time and starts the hang time timer. As discussed above, the hang time preferably decreases as call time increases. Upon initiating the hang time timer, the communication unit determines (323) whether call reassignment has occurred within the hang time. The determination of whether call reassignment has occurred is preferably performed by monitoring the allocated communication resource for incoming audio information. When call reassignment has occurred within the hang time (e.g., incoming audio is present on the allocated communication resource), the communication unit continues the logic flow at decision block 309. However, when call reassignment has not occurred within the hang time, the communication unit transmits (325) an end of call signal to the system controller (e.g., via the communication unit's serving base site) and the other communication units in the group (e.g., via the system controller), and the logic flow (as well as the communication) ends (327).

In addition to determining call time and hang time during the communication, the communication unit also determines (313) a signal quality metric (SQM) of an outbound portion (e.g., outbound time slot) of the allocated communication resource. Upon determining the signal quality metric, the communication unit determines (315) whether the signal quality metric is indicative of acceptable signal quality. The determination of whether or not the signal quality metric indicates acceptable signal quality preferably comprises comparing the signal quality metric (e.g., C/(I+N)) to a threshold (e.g., 19 dB) and, when the measured signal quality metric is below the threshold, determining that the signal quality metric is indicative of unacceptable signal quality.

When the communication unit determines that the signal quality metric is indicative of unacceptable signal quality, the communication unit determines (317) a target communication resource from a list of communication resources. In a preferred embodiment, this determination comprises selecting a base site control communication resource from the neighbor site list maintained within the communication unit. As discussed above, the communication unit receives its neighbor site list from the system controller prior to establishment of the communication. However, the neighbor site list is not updated by the system controller during the dispatch communication because the communication unit does not have access to the serving base site's control channel. As described above, the present invention, through its use of a variable hang time, provides for more frequent updating of neighbor site lists than do existing dispatch systems, thereby improving the signal quality of dispatch communications in multi-site systems.

Upon selecting the target resource and, in effect, the target base site, the communication unit transmits (319) a request for reconnection into the dispatch communication to the target base site via the target base site's control communication resource. The communication unit is reconnected into the dispatch communication in accordance with known techniques and continues (321) the dispatch communication via a traffic communication resource provided by the target base site.

In a preferred embodiment, steps 307–317 and 323, and part of steps 303 (e.g., generation of the request message), 305 (e.g., analysis of the resource allocation), 319 (e.g., generation of the reconnect request), 321 (e.g., generation of internal instructions to continue communication on the target base site's traffic resource), and 325 (e.g., generation of the end of call message) of the above logic flow diagram 300 are performed by a computer program that is stored in a computer-readable memory device of the communication unit.

The present invention encompasses a method and apparatus for communicating in a dispatch communication system. With this invention, hang time is reduced as the call time increases, thereby reducing the average duration of dispatch communications and, accordingly, reducing the probability of call dragging. By reducing the probability of call dragging, the present invention improves, on average, the received signal quality of group calls made in the system by permitting communication units in the group to access the control channel and receive updated neighbor site lists more often as compared to prior art techniques.

While the present invention has been particularly shown and described with reference to particular embodiments thereof, it will be understood by those skilled in the art that various changes in form and details may be made therein without departing from the spirit and scope of the present invention.

I claim:

1. A method for communicating in a dispatch communication system that includes a plurality of base sites and a system controller, wherein each base site of the plurality of base sites provides communication service to a respective service coverage area of a plurality of service coverage areas and wherein the system controller controls allocation of radio communication resources to groups of communication units as individual communication units of the groups travel throughout the plurality of service coverage areas, the method comprising the steps of:

a) establishing a dispatch communication between a first group of communication units;

b) determining a first length of time since establishment of the dispatch communication;

c) determining whether an event indicative of call reassignment has occurred;

d) when the event indicative of call reassignment has occurred, determining, based on the first length of time, a second length of time commencing at a time of the event for maintaining allocation of a radio communication resource assigned to the dispatch communication;

e) determining whether call reassignment has occurred within the second length of time; and f) when call reassignment has not occurred within the second length of time, terminating the dispatch communication.

2. The method of claim 1, further comprising the step of:

g) when call reassignment has occurred within the second length of time, repeating steps (c)–(f).

3. The method of claim 1, wherein step (c) comprises the step of determining whether a push-to-talk button of a communication unit in the first group has been released.

4. The method of claim 1, wherein step (a) comprises the steps of:

a1) receiving, by the system controller, a dispatch communication request from a communication unit in the first group; and a2) allocating, by the system controller, at least one radio communication resource to support the dispatch communication.

5. The method of claim 1, wherein step (a) comprises the steps of:

a1) transmitting, by a communication unit in the first group, a dispatch communication request; and a2) receiving, by the communication unit responsive to the dispatch communication request, a radio communication resource allocation to support the dispatch communication.

6. The method of claim 1, wherein step (f) comprises the step of, when call reassignment has not occurred within the second length of time, transmitting, by the system controller, a call termination message to the first group of communication units.

7. The method of claim 1, wherein step (f) comprises the step of, when call reassignment has not occurred within the second length of time, transmitting, by a communication unit in the first group, an end of call signal to the system controller via a base site of the plurality of base sites.

8. The method of claim 1, further comprising the steps of:

at a time prior to termination of the dispatch communication:

g) determining, by a communication unit of the first group, a signal quality metric of a first radio communication resource supporting the dispatch communication;

h) when the signal quality metric is indicative of unacceptable signal quality, determining, by the communication unit, a second radio communication resource;

i) requesting, by the communication unit, reconnection into the dispatch communication via the second radio communication resource; and j) continuing, by the communication unit, the dispatch communication via a third radio communication resource.

9. A system controller that allocates radio communication resources in support of dispatch communications among a group of communication units as individual communication units of the group travel throughout a plurality of service coverage areas of a dispatch communication system, the system controller comprising:

a signaling interface coupled to a plurality of base sites that provide communication service to the plurality of service coverage areas; and a memory device, coupled to the signaling interface, having stored therein a computer program that, when executed, performs the following functions:

establishes a dispatch communication between the group of communication units;

determines a first length of time since establishment of the dispatch communication;

determines whether an event indicative of call reassignment has occurred;

when the event indicative of call reassignment has occurred, determines, based on the first length of time, a second length of time commencing at a time of the event for maintaining allocation of a radio communication resource assigned to the dispatch communication;

determines whether call reassignment has occurred within the second length of time; and when call reassignment has not occurred within the second length of time, terminates the dispatch communication.

10. A communication unit in a dispatch communication system, the communication unit being one member of a group of communication units that travel throughout a plurality of service coverage areas of the dispatch communication system, the communication unit comprising:

a transmitter that transmits radio communication resource requests and voice information to at least one base site of a plurality of base sites that provide communication service to the plurality of service coverage areas;

a receiver that receives radio communication resource allocations and voice information from the at least one base site; and a memory device, coupled to the transmitter and the receiver, having stored therein a computer program that, when executed, performs the following functions:

establishes a dispatch communication between the group of communication units;

determines a first length of time since establishment of the dispatch communication;

determines whether an event indicative of call reassignment has occurred;

when the event indicative of call reassignment has occurred, determines, based on the first length of time, a second length of time commencing at a time of the event for maintaining allocation of a radio communication resource assigned to the dispatch communication;

determines whether call reassignment has occurred within the second length of time; and when call reassignment has not occurred within the second length of time, terminates the dispatch communication.

* * * * *